US007817765B2

(12) United States Patent
Kitagawa

(10) Patent No.: US 7,817,765 B2
(45) Date of Patent: Oct. 19, 2010

(54) DIGITAL TRANSMISSION APPARATUS AND METHODS

(75) Inventor: Tsuyoshi Kitagawa, Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 523 days.

(21) Appl. No.: 11/828,271

(22) Filed: Jul. 25, 2007

(65) Prior Publication Data

US 2008/0152064 A1 Jun. 26, 2008

(30) Foreign Application Priority Data

Jul. 26, 2006 (JP) ............... 2006-202749

(51) Int. Cl.
*H04L 7/00* (2006.01)
*H04L 25/00* (2006.01)
*H04L 25/40* (2006.01)

(52) U.S. Cl. ............... 375/372; 375/371; 375/373; 375/376; 375/362; 370/229; 370/395.62; 370/503; 714/798

(58) Field of Classification Search ......... 375/371–373, 375/376, 362; 370/229, 395.62, 503; 714/798
See application file for complete search history.

(56) References Cited

U.S. PATENT DOCUMENTS 5,742,623 A * 4/1998 Nuber et al. ............ 714/798
6,940,873 B2 * 9/2005 Boyle et al. ............ 370/503
7,561,582 B2 * 7/2009 Ohta et al. ............ 370/395.62

FOREIGN PATENT DOCUMENTS

JP 2003-101976 A 4/2003
JP 2005-151153 A 6/2005

OTHER PUBLICATIONS

English translation (JPO machine translation) of JP 2003-101976, 6 pages.
English translation (JPO machine translation) of JP 2005-151153, 7 pages.
Xingdong W et al: "Implementation of MPEG-2 Transport Stream Remultiplexer for DTV Broadcasting" IEEE Transactions on Consumer Electronics, IEEE Service Center, New York, NY, US LNKD-DOI:10.1109/TCE.2002.1010139, vol. 48, No. 2, May 1, 2002, pp. 329-334, XP001200461 ISSN: 0098-3063.
Liang Longfei et al: "Implementation of a New MPEG-2 Transport Stream Processor For Digital Television Broadcasting" IEEE Transactions on Broadcasting, IEEE Service Center, Piscataway, NJ, US LNKD-DOI:10.1109/TBC.2002.806799, vol. 48, No. 4, Dec. 1, 2002, XP011070282 ISSN: 0018-9316.
"Systems FAQ" Joint Video Team (JVT) of ISO/IEC MPEG & ITU-T VCEG (ISO/IEC JTC1/SC29/WG11 and ITU-T SG16 Q6), XX, XX, No. N2223, Mar. 20, 1998, XP030010706.

* cited by examiner

*Primary Examiner*—Phuong Phu
(74) *Attorney, Agent, or Firm*—Matthew D. Rabdau

(57) ABSTRACT

PCR jitter is improved when writing an input stream TS having a packet with a PCR in a memory 10 and reading it at a high speed. An oscillator 44 oscillates a local clock signal having a frequency of a reference clock for the input TS and a counter 46 counts the local clock signal. When a PCR detection section 38 detects the PCR in the input TS, a latch circuit 42 latches a counted value of the counter and a PCR exchange section 40 exchanges the original PCR with a result of subtracting the latched count value from the PCR of the input TS.

13 Claims, 6 Drawing Sheets

DIGITAL TRANSMISSION APPARATUS AND METHODS

BACKGROUND

Embodiments of the present invention relate to apparatus and methods for transmitting digital data, and more particularly to apparatus and methods for transmitting video data.

Various kinds of apparatus and methods have been proposed to transmit digital data. For example, in a case that the digital data is MPEG-2 system, there are two types of MPEG-2 system where one is a Program Stream (PS) and the other one is a Transport Stream (TS). The program stream is designed to be used in a relatively less error prone environment. On the other hand, the transport stream is designed to be used in an environment where errors occur often, but it can combine multiple programs into a single stream. The transport stream is used in a digital broadcasting. The transport stream is a time division stream where an elementary stream (ES) is divided into transmission units, each unit is called a transport stream packet (TS packet). FIG. 1A shows an example of the transport stream. Each of TS packets A-C comprises a TS header and a payload, and time information PCR (Program Clock Reference) representative of a time reference is set for the TS header of a predetermined TS packet (for example, the packet B). The PCR has the time information that is inserted at a transmitter side by counting a clock, e.g. 27 MHz clock. A synchronized operation is done on a receiver side by reference to the time information PCR.

In such a digital transmission system, especially MPEG-2 system, as shown in FIG. 2, the receiver writes the input transport stream in a FIFO (First-In First-Out) memory 10 in response to an input TS clock and reads out the written transport stream in response to an output TS clock in order to produce an output transport stream. Therefore, the FIFO memory 10 acts as a buffer. The input TS clock signal is generated by reference to the input transport stream. If a frequency of the input TS clock is the same as that of the output TS clock, a writing speed and a reading speed of the FIFO memory 10 are the same and no problems occur. However, if the data process at the receiver side causes the output TS clock frequency to be higher than the input TS clock frequency, namely, if the reading speed is higher than the writing speed, the input transport memory in the FIFO memory 10 goes out and the memory becomes empty and thereby a receiving wait condition occurs. In order to solve this disadvantage, an apparatus shown in FIG. 3 was proposed. In this apparatus, a null packet generator 12 is provided to generate a null packet that is a dummy packet. Control means 14 watches the writing speed and the reading speed of the FIFO memory 10 and controls an electronic switch 16 to insert the null packet into the output transport stream from the FIFO memory when a difference between the writing and reading speeds exceeds an allowable range. In a case that the difference between the writing and reading speeds is out of the allowable range, the switch 16 selects the FIFO memory 10. The out of the allowable range means a situation that the volume of the input (transport) stream stored in the FIFO memory 10 is equal to or less than a predetermined value in accordance with the speed difference between the reading and writing speeds and this situation is just before a situation that it is hard to read out the stream from the FIFO memory in accordance with the speed difference.

An operation as illustrated in FIG. 3 will be discussed by reference to FIG. 1. In FIG. 1, it is assumed that each packet data volume of the input transport stream A is the same as that of the output transport stream B, and each packet length of the output transport stream B is shorter than that of the input transport stream A because the reading speed is higher than the writing speed. In FIGS. 2 and 3, the same reference numbers have been employed to designated like blocks and their operations will not be explained, as they are known to those skilled in the art. First, an electronic switch 16 selects the FIFO memory 10. The input transport stream shown in FIG. 1A is written in the FIFO memory 10 in response to the input TS clock. After the packet A is written completely, the packet A is read out as the output transport steam of FIG. 1B in response to the output TS clock. The packet B is not written in the FIFO memory 10 completely after the packet A is read out. Then, the control means 14 detects this situation of the out of the allowable range, makes the electronic switch 16 to select the null packet generator 12 so as to insert the null packet into the output transport stream B. Since the packet B of the input transport stream is being written in the FIFO memory 10 at a time when the null packet is completely inserted, the control means 14 makes the electronic switch 16 to select the FIFO memory 10 so as to read out the packet B from the FIFO memory 10 as the output transport stream. The operation of writing the packet C of the input transport stream into the FIFO memory 10 is completed at a time when the packet B is completed to be read out. Ongoingly, the FIFO memory 10 is in the reading operation to produce the packet C as the output transport stream.

In this example, the time information PCR representative of the time reference is set to the packet B. In the output transport stream B, the null packet as the dummy is inserted between the packets A and B. Since the time information of the PCR in the packet B takes no account of the time for the dummy packet, a disadvantage is that a PCR jitter occurs.

In order to overcome the above discussed disadvantage, an apparatus shown in FIG. 4 was proposed. The same reference numbers in FIG. 4 have been employed to designated like blocks in FIGS. 2 and 3 and their operations will not be explained, as they are known to those skilled in the art. A first PCR detection means 18 detects a PCR value from the input transport stream. Comparator means 20 compares the PCR value detected by the PCR detection means 18 with the counted value of a PCR counter 24 so as to control an oscillation frequency (for example 27 MHz) of a voltage controlled oscillator (VCO) 22 in accordance with the difference of these values. The counter 24 counts a pulse signal from the VCO 22. Therefore, the blocks 20, 22 and 24 operate such that the counted value of the counter 24 is synchronism with the PCR of the input transport stream. A second PCR detection means 26 detects the PCR in the transport stream from the electronic switch 16. A PCR exchange means 28 exchanges the PCR value in the transport stream from the electronic switch 16 with the counted value of the counter 24 in response to a detection signal from the second PCR detection means 26 (that represents a detection timing of the PCR). Even if the null (dummy) packet is inserted between the packet A and the packet B as shown in FIG. 1B, the PCR counter 24 counts a time for the null packet and thereby the PCR of the packet B is replaced with the new PCR value that takes account of the period of the null packet. Such apparatus is disclosed in, for example, Japanese Unexamined Patent Publication No. 11-239179. In the digital transmission apparatus in FIG. 4, if a transmission is interrupted, the PCR in the packet with PCR becomes an outlying value so that the oscillation frequency of the VCO gets out of order significantly, the counted value of the PCR counter 24 gets out of order too and the PCR exchange means 28 cannot exchange the PCR correctly. In addition, an offset between the counted value from the counter 24 and the PCR value detected by the PCR detection means 18 becomes unstable, so that the PCR value as well as PTS (Presentation Time Stamp)/DTS (Decoding Time Stamp) values should be corrected. For this purpose, an additional PTS/DTS value correction circuit is required.

In order to overcome the above discussed disadvantage of the apparatus shown in FIG. 4, an apparatus shown in FIG. 5 was proposed. The same reference numbers in FIG. 5 have been employed to designated like blocks in FIGS. 2, 3 and 4 and their operations will not be explained. A first PCR detection means 30 detects the PCR from the input transport stream, applies the PCR value to a load terminal of a counter 34 and applies a detection signal representative of the PCR detection timing to a preset terminal PR of the counter 34 and to a synchronous oscillator 32. The synchronous oscillator 32 oscillates a 27 MHz pulse signal in synchronism with the PCR detection timing. The counter 34 loads the PCR when the PCR detection means 30 detects the PCR in the input transport stream and then the counter 34 counts the output pulse from the oscillator 32 from this load value. Therefore, the counter 34 is reset to the PCR value every time when detecting the packet with the PCR from the input transport stream and then the counter 34 counts the pulse from the oscillator 32 from the value to reset to the PCR value. The PCR exchange means 28 exchanges the PCR value of the output transport stream with the PCR value generated by the counter 34 every time when the second PCR detection means 26 detects the PCR in the output from the switch 16. This apparatus is disclosed in, for example, Japanese Unexamined Patent Publication No. 2005-151153.

In the digital transmission apparatus shown in FIG. 5, when plural programs are combined to a single stream, which is one advantage of the transport steam, each program has its own PCR having a different continuity so that the first PCR detection means 30 should detect which program belongs to the detected PCR and a counter 34 is required for each program. Moreover, the PCR exchange means 28 should recognize which program belongs to the PCR detected by the second PCR detection means 26 and should select one of the plurality of counters for exchanging the PCR. The apparatus of FIG. 5 can improve the PCR jitter but is expensive in configuration. The above description is for MPEG-2 system but there is a similar problem in digital data transmission other than MPEG-2 system.

What is desired are digital transmission apparatus and methods that store an input stream at a writing speed, the input stream comprising a packet train including a packet to which time information representative of a time reference, e.g., a PCR is set, and improves the jitter of the time information when reading out the output stream from the memory at a reading speed higher than the writing speed. Such apparatus and method is desired to be simple in configuration and inexpensive for multiple stream trains, e.g., transport streams for multiple programs.

SUMMARY

An aspect of the present invention is a digital transmission apparatus for storing an input stream in a memory at a writing speed, the input stream comprising a packet train including a packet to which time information representative of a time reference is set, and for reading out an output stream from said memory at a reading speed higher than the writing speed, the digital transmission apparatus, comprising: first detection means for generating a first detection signal when detecting the time information in the input stream; oscillation means for oscillating a local clock signal having a frequency of a reference clock for the input stream; a counter for counting the local clock signal from said oscillation means; first latch means for latching the counted value of said counter in response to the first detection signal; first exchange means for subtracting the counted value latched by said first latch means from the time information in the input stream and applying an input stream having the subtracted result as new time information to said memory; dummy insertion means for inserting a dummy packet into the output stream from said memory when a difference between the reading speed and the writing speed exceeds an allowable range; second detection means for generating a second detection signal when detecting the time information in the output stream from said dummy insertion means; second latch means for latching the counted value of said counter in response to the second detection signal; and second exchange means for adding the counted value latched by said second latch to the time information in the output stream from said dummy insertion means and generating an output stream having the added result as new time information.

Another aspect of the present invention is a digital transmission method for storing an input stream in a memory at a writing speed, the input stream comprising a packet train including a packet to which time information representative of a time reference is set, and for reading out an output stream from said memory at a reading speed higher than the writing speed, the digital transmission method, comprising the steps of: obtaining a first latch value by latching a counted value of a counter when detecting the time information in the input stream, said counter counting a frequency signal of a reference signal for the input stream; subtracting the first latch value from the time information in the input stream and applying an input stream having the subtracted result as new time information to said memory; inserting a dummy packet into the output stream from said memory when a difference between the reading speed and the writing speed exceeds an allowable range; obtaining a second latch value by latching a counted value of said counter when detecting the time information in the output stream having the inserted dummy packet; and adding the second latch value to the time information in the output stream and generating an output stream having the added result as new time information.

Embodiments of the present invention improve the jitter of time information when writing an input stream in a memory and reading it therefrom, the input stream comprising a packet train including a packet to which time information representative of a time reference is set. Some embodiments of this invention are simple and inexpensive for handling multiple stream trains.

The objects, advantages and other novel feature of the present invention are apparent from the following detailed descriptions when read in light of the appended claims and attached drawing.

DETAILED DESCRIPTION

Figure 4:
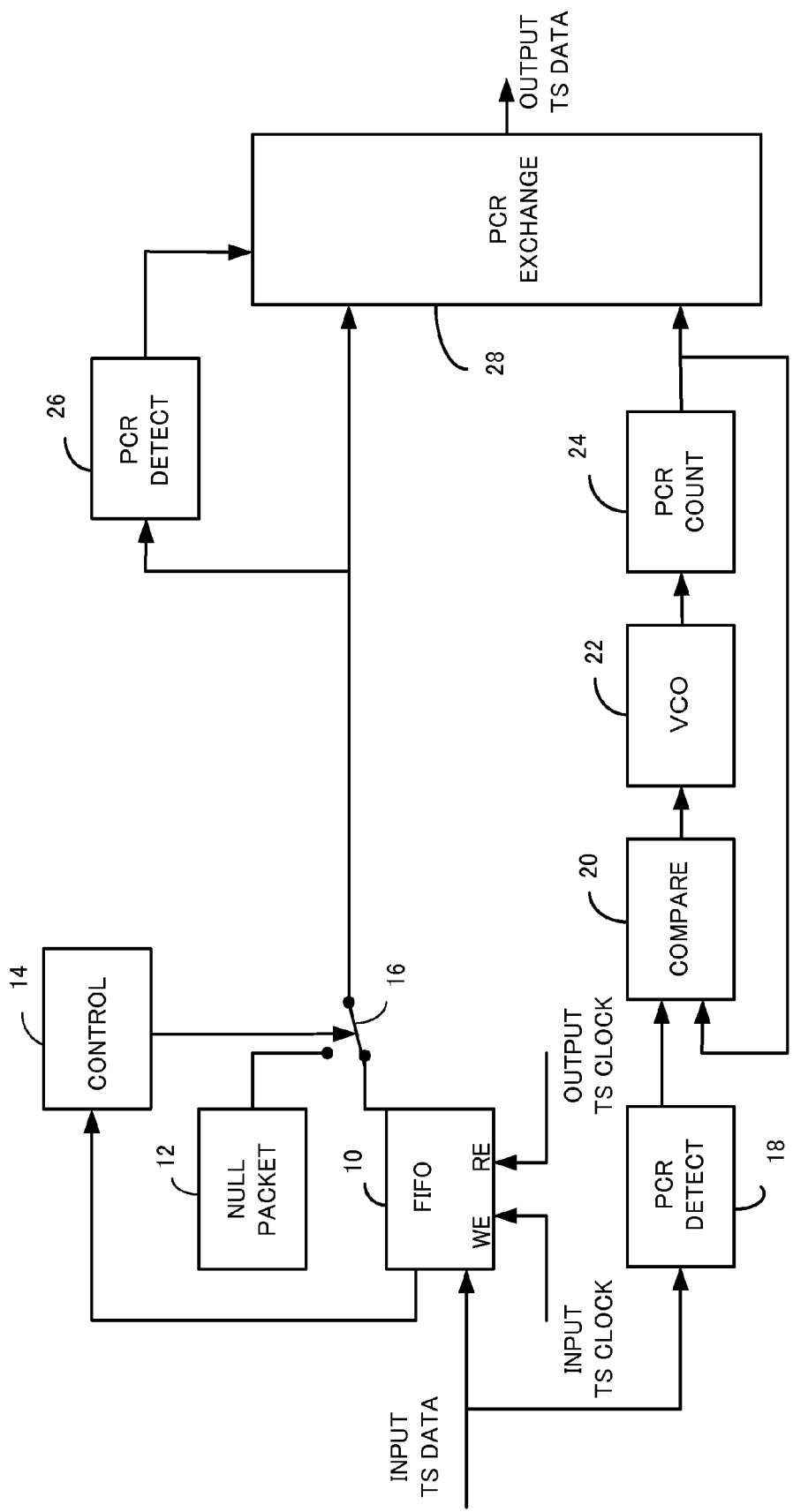
FIG. 4 is a block diagram for explaining another prior art that improves FIG. 3.
Figure 5:
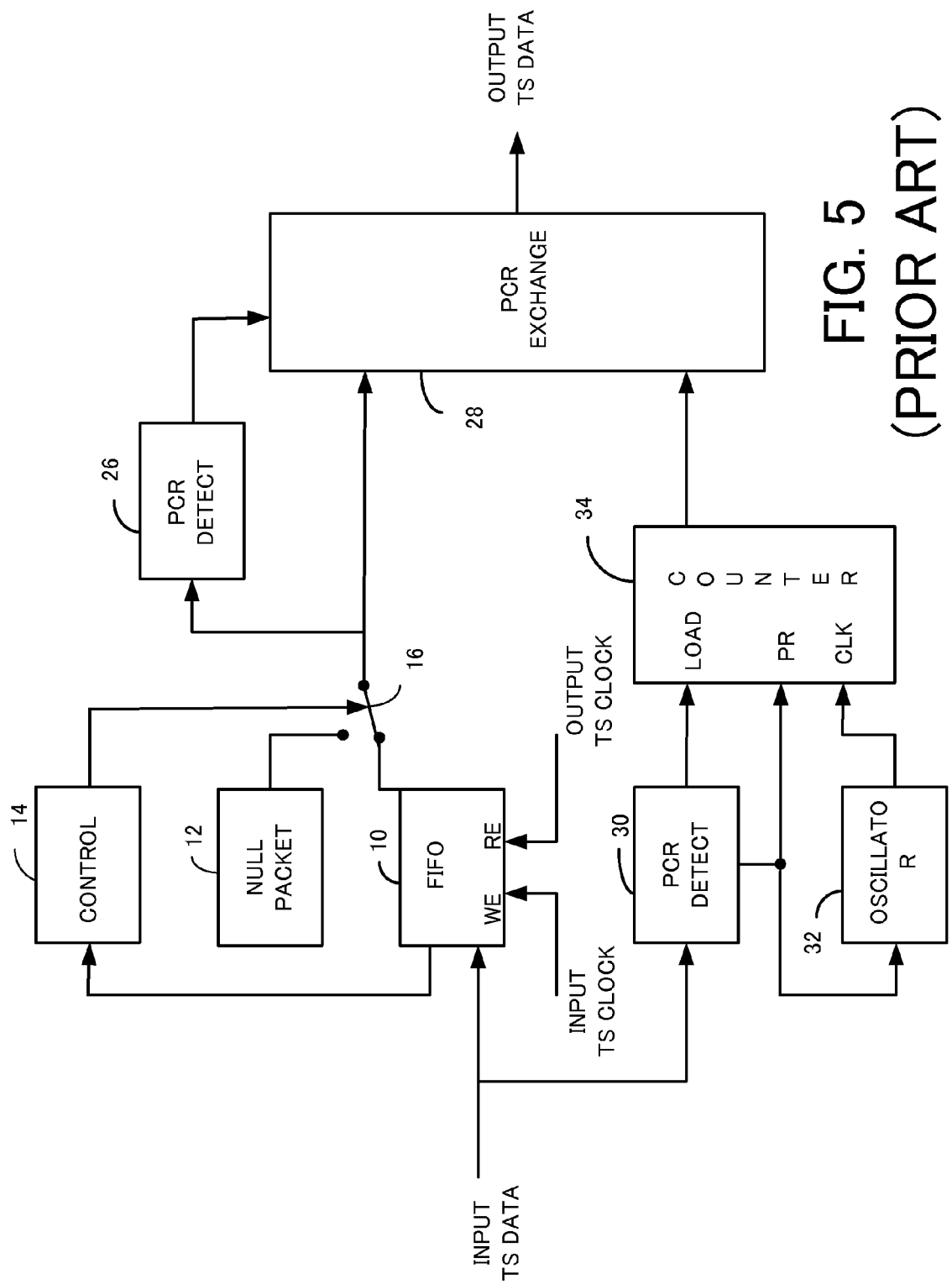
FIG. 5 is a block diagram for explaining another prior art that improves FIG. 4.
Figure 6:
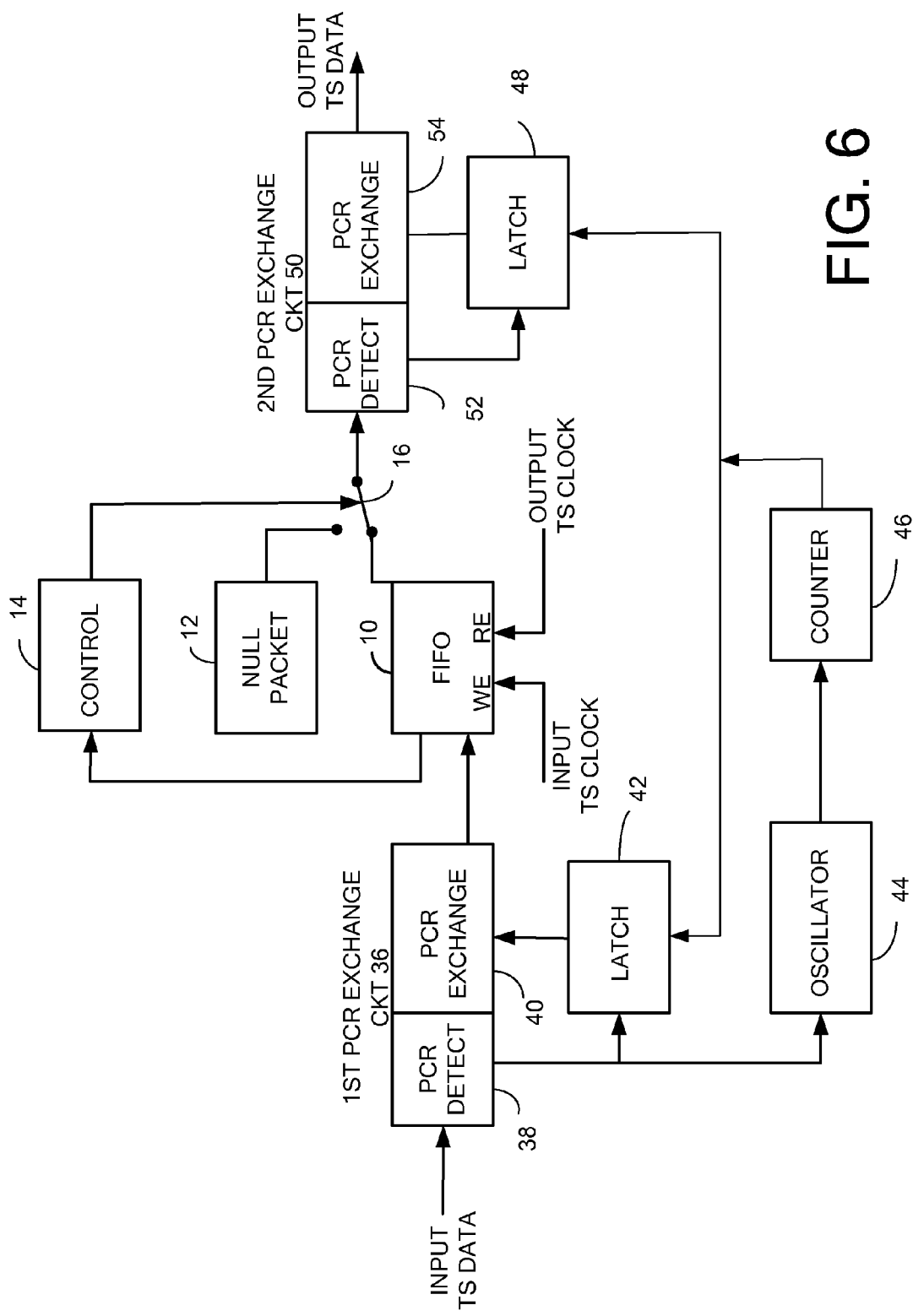
FIG. 6 is a block diagram of an embodiment according to the present invention.

FIG. 6 shows a block diagram of an embodiment according to the present invention, where the invention is applied to MPEG-2 system. The same reference numbers in FIG. 6 have been employed to designate like blocks in FIGS. 2-5. A first PCR exchange circuit 36 detects the time information PCR representative of the time reference and exchanges it. This PCR exchange circuit 36 comprises a PCR detection section (first detection means) 38 and a PCR exchange section (first exchange means) 40. The PCR detection section 38 generates a first detection signal when detecting the PCR set to a packet header of the input transport stream. The first detection signal is applied as a latch timing signal to a latch circuit (first latch means) 42 and as a sync signal to a synchronous oscillator (oscillation means) 44. The oscillator 44 comprises, for example, the comparison means 20 and the VCO 22 of FIG. 4 and a feedback path for feeding the output signal from the VCO back to the comparison means. The oscillator 44 oscillates a local clock signal, e.g., 27 MHz clock signal, in synchronism with the detection signal from the PCR detection section 38. A counter 46 is, for example, a 42-bit counter, and counts the local clock signal from the oscillator 44 to apply the counted value (digital data) to the latch circuit 42 and another latch circuit (second latch means) 48. The latch circuit 42 latches the counted value (C0) of the counter 46 at a time when receiving the first detection signal from the PCR detection section 38 or detecting the PCR in the input transport stream. The PCR exchange section 40 subtracts the counted value latched by the latch circuit 42 from the PCR value in the input transport stream and exchanges the original PCR value (P0) of the input transport stream with the subtracted result. Therefore, a new PCR value (P1) is represented by P1=P0-C0.

Figure 1:
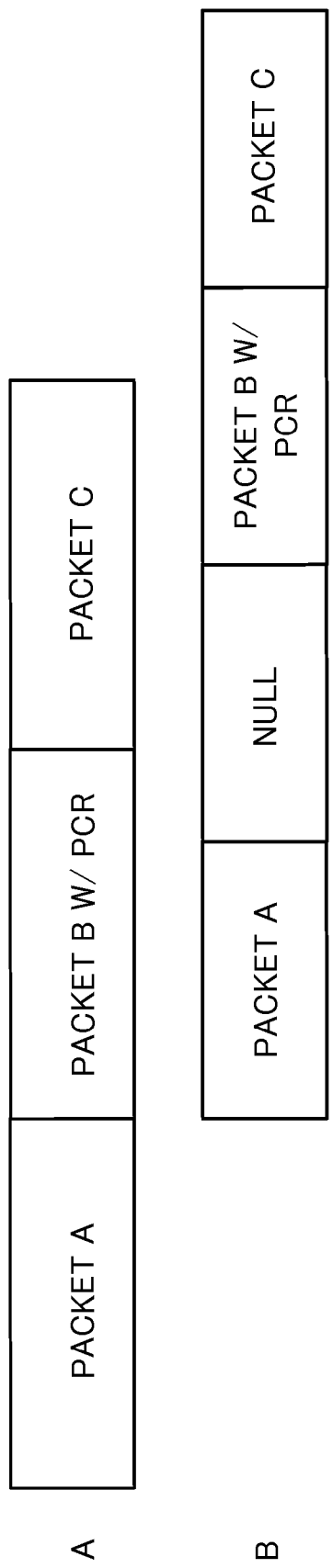
FIG. 1 is a drawing for explaining a transport stream.
Figure 2:
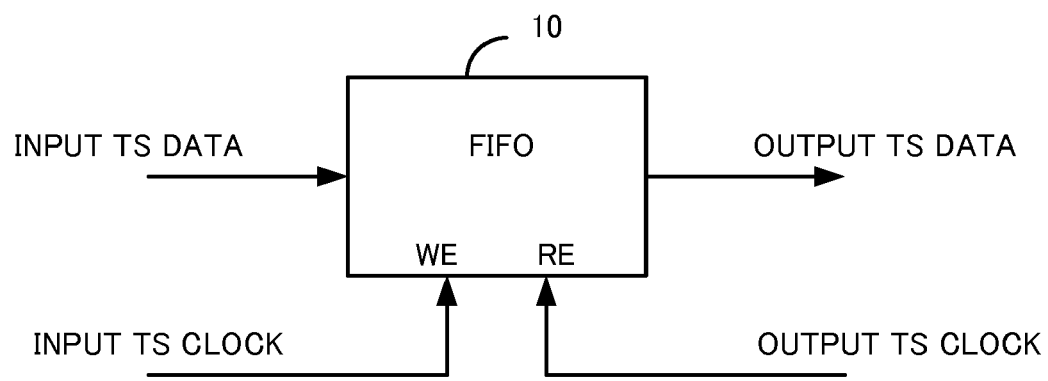
FIG. 2 is a block diagram for explaining a prior art.
Figure 3:
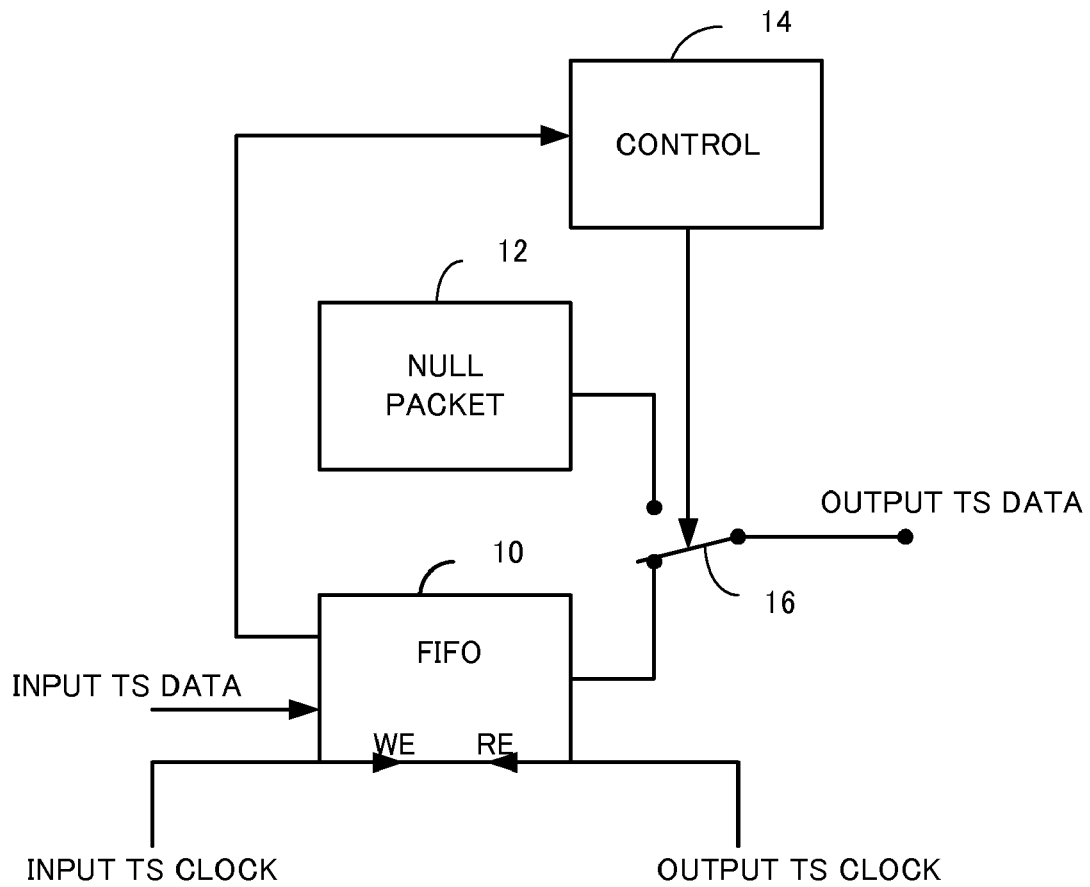
FIG. 3 is a block diagram for explaining another prior art that improves FIG. 2.

The memory 10 is a FIFO memory to which the transport stream from the PCR exchange section 40, in response to an input TS clock, and from which the stream is read out, in response to an output TS clock. Since the output TS clock frequency is higher than the input TS clock frequency, the reading speed is faster than the writing speed. When the FIFO memory 10 does not store at least one packet of the input transport stream, it is in a waiting condition. The control means 14 monitors an operation condition of the FIFO memory 10. When a difference between the writing speed and the reading speed exceeds an allowable range or is the out of the allowable range, the control means 14 makes the electric switch 16 to select the null (dummy) packet generator 12 from a side of the FIFO memory 10. Then, the null packet is inserted into the transport steam from the memory 10 as shown in FIG. 1B. When the difference between the writing and reading speeds becomes within the allowable range, the control means 14 makes the electronic switch 16 to select the FIFO memory 10. These null packet generator 12, control means 14 and electronic switch 16 act as the dummy insertion means. A fact that the difference between the writing and reading speeds is out of the allowable range means that the volume of the input transport stream stored in the FIFO memory 10 is equal to or less than a predetermined value in accordance with the speed difference between the reading and writing speeds and this situation happens before a situation that it is hard to read out the stream from the FIFO memory 10 in accordance with the speed difference.

The output terminal of the electronic switch 16 is connected to a second PCR exchange circuit 50. This second PCR exchange circuit 50 comprises a PCR detection section (second detection means) 52 and a PCR exchange section (second exchange means) 54. The PCR detection section 52 generates a second detection signal when detecting the PCR in the output transport stream from the electronic switch 16. The counter 46 is a ring (circulating) counter that counts continuously the local clock signal from the oscillator 44. The latch circuit 48 latches the counted value C1 of the counter 46 in response to the second detection signal from the PCR detection section 52. The PCR exchange section 54 adds the counted value C1 latched by the latch circuit 48 to the PCR value P2 in the output transport stream in response to the detection signal from the PCR detection section 52 so as to produce a new PCR value. The PCR exchange section 54 exchanges the original PCR value (P2) of the output transport stream with the new value. Therefore, the new PCR value (P3) is represented by P3=P2+C1. The final output is the transport stream having the exchanged PCR.

In a case that the null packet is not inserted or the electric switch 16 is connected to the FIFO memory 10, when the packet B with the PCR passes through the first PCR exchange circuit 36, the FIFO memory 10 and the first PCR exchange circuit 50, the first PCR exchange section 40 changes the PCR value of the transport stream from the original P0 to the P1(=P0-C0) and the second PCR exchange section 54 changes the PCR value from the P1 to the P3. In this case, P2=P1. Then, the PCR value P3 in the output transport stream is P3=P1+C1=(P0-C0)+C1=P0+(C1-C0). Since C0 and C1 are the counted values of the counter 46 when the PCR detection sections 38 and 52 detect the PCR respectively, the value C1-C0 corresponds to a propagation delay time while the transport stream transmits from the first PCR exchange circuit 36 (PCR detection section 38) to the second PCR exchange circuit 50 (PCR exchange section 54). If this propagation delay time can be ignored, the value C1-C0 is substantially zero and the PCR in the output transport stream is the same as the PCR in the input transport stream.

In a case that the null (dummy) packet is inserted prior to the packet B with the PCR as shown in FIG. 1b, the value C1-C0 is a sum of the insertion period of the null packet and the propagation delay time from the first PCR exchange circuit 36 to the second PCR exchange circuit 50. If the propagation delay time can be ignored, the value C1-C0 corresponds to the insertion period of the null packet. Then, the PCR of the output transport stream is a sum of the PCR in the input transport stream and the period of the inserted null packet. Therefore, the continuity of the PCR can be kept and the PCR jitter can be improved when the null packet is inserted. If the null packet is inserted not prior to the packet with PCR, the above situation can be applied.

The above description is done for a case that the propagation delay time from the first PCR exchange circuit 36 (PCR detection section 38) to the second PCR exchange circuit 50 (PCR exchange section 54). However, if this propagation delay time cannot be ignored, a compensation value H is subtracted by the second PCR exchange section 54 for compensating the propagation delay time. In other words, the PCR exchange section 54 obtains P3=P2+C1-H (wherein P2: the PCR value in the transport stream input to the second PCR exchange circuit 50, and C1: the value of the latch circuit 48), and the PCR in the output transport stream is exchanged with the P3. Please note that the propagation delay time is a fixed value. The compensation value H may be obtained with an actual measurement by applying a transport stream having a dummy PCR as an input transport stream.

As described hereinbefore, the PCR value in the transport stream flowing through the digital transmission apparatus of the present invention is always based on the original PCR regardless of the exchange. Moreover, the original PCR is not replaced with a completely different PCR when compensating the dummy packet. Therefore, in a case that plural programs are combined to a single stream where the PCR continuities of the programs are different from each other, the present invention does not need a dedicated circuit for each program and can use the first and second PCR exchange circuits, the latch circuits, the counter, etc. in common for all the programs.

In the above description, the oscillator 44 operates in synchronization with the PCR in the input transport stream. However, if the input transport steam is 256 kbps and an accuracy of the PCR is 30 ppm (with respect to the MPEG standard), the oscillator 44 of 27 MHz oscillation frequency may be an asynchronous oscillator having 50 ppm accuracy. In this case, it is not necessary to apply the detection signal from the first PCR detection section 38 to the oscillator 44.

The above description discusses the MPEG-2 system. However, the present invention can be applied to a system other than the MPEG-2 system where the input stream written in the memory comprises a packet train including a packet to which time information representative of a time reference is set. The electronic switch 16 may be a digital multiplexer.

What is claimed is:

1. In a digital transmission apparatus for storing an input stream in a memory at a writing speed, the input stream comprising a packet train including a packet to which time information representative of a time reference is set, and for reading out an output stream from said memory at a reading speed higher than the writing speed, the digital transmission apparatus, comprising:

first detection means for generating a first detection signal when detecting the time information in the input stream;

oscillation means for oscillating a local clock signal having a frequency of a reference clock for the input stream;

a counter for counting the local clock signal from said oscillation means;

first latch means for latching the counted value of said counter in response to the first detection signal;

first exchange means for subtracting the counted value latched by said first latch means from the time information in the input stream and applying an input stream having the subtracted result as new time information to said memory;

dummy insertion means for inserting a dummy packet into the output stream from said memory when a difference between the reading speed and the writing speed exceeds an allowable range;

second detection means for generating a second detection signal when detecting the time information in the output stream from said dummy insertion means;

second latch means for latching the counted value of said counter in response to the second detection signal; and second exchange means for adding the counted value latched by said second latch to the time information in the output stream from said dummy insertion means and generating an output stream having the added result as new time information.

2. The digital transmission apparatus as recited in claim 1 wherein said second exchange means further adds a compensation value to the time information, the compensation value corresponding to a period while the stream transfers from said first detection means to said second exchange means, and said second exchange means generates an output stream having the added result as new time information.

3. The digital transmission apparatus as recited in claim 1 wherein said dummy insertion means defines the out of the allowable range when the volume of the input stream stored in said memory is equal to or less than a predetermined value in accordance with the difference between the reading speed and the writing speed.

4. The digital transmission apparatus as recited in claim 1 wherein said oscillation means is phase locked to the first detection signal.

5. The digital transmission apparatus as recited in claim 1 wherein said memory is a FIFO memory.

6. The digital transmission apparatus as recited in claim 1 wherein the input stream is a MPEG 2 system signal.

7. In a digital transmission method for storing an input stream in a memory at a writing speed, the input stream comprising a packet train including a packet to which time information representative of a time reference is set, and for reading out an output stream from said memory at a reading speed higher than the writing speed, the digital transmission method, comprising the steps of:

obtaining a first latch value by latching a counted value of a counter when detecting the time information in the input stream, said counter counting a frequency signal of a reference signal for the input stream;

subtracting the first latch value from the time information in the input stream and applying an input stream having the subtracted result as new time information to said memory;

inserting a dummy packet into the output stream from said memory when a difference between the reading speed and the writing speed exceeds an allowable range;

obtaining a second latch value by latching a counted value of said counter when detecting the time information in the output stream having the inserted dummy packet; and adding the second latch value to the time information in the output stream and generating an output stream having the added result as new time information.

8. In a digital transmission apparatus for storing an input stream in a memory at a writing speed, the input stream comprising a packet train including a packet to which time information representative of a time reference is set, and for reading out an output stream from said memory at a reading speed higher than the writing speed, comprising:

a PCR exchange circuit comprising a first detection section to generate a first detection signal when time information from the input stream is detected;

an oscillator providing a local clock signal having a reference clock for the input stream;

a counter for counting the local clock signal from said oscillator to provide a counted value;

a latch circuit to latch the counted value of the counter in response to the first detection signal;

an exchange section of the PCR exchange circuit to subtract the counted value latched by the first latch circuit from the time information in the input stream and applying an input stream having the subtracted result as new time information to said memory;

a controller to insert a dummy packet from a null packet generator into the output stream from said memory when a difference between the reading speed and the writing speed exceeds an allowable range;

a second PCR exchange circuit comprising a second detection section generating a second detection signal when detecting the time information in the output stream from said null packet generator;

a second latch circuit latches the counted value of the counter in response to the second detection signal; and a second exchange section of the second PCR exchange circuit adding the counted value latched by said second latch to the time information in the output stream from the null packet generator and generating an output stream having the added result as new time information.

9. The digital transmission apparatus as recited in claim 8 wherein the second exchange section further adds a compensation value to the time information, the compensation value corresponding to a period while the stream transfers from the first detection section to said second exchange section, and said second exchange section generates an output stream having the added result as new time information.

10. The digital transmission apparatus as recited in claim 8 wherein the controller defines the out of the allowable range when the volume of the input stream stored in said memory is equal to or less than a predetermined value in accordance with the difference between the reading speed and the writing speed.

11. The digital transmission apparatus as recited in claim 8 wherein the oscillator is phase locked to the first detection signal.

12. The digital transmission apparatus as recited in claim 8 wherein the memory is a FIFO memory.

13. The digital transmission apparatus as recited in claim 8 wherein the input stream is a MPEG 2 system signal.

* * * * *